Oct. 25, 1927.
F. PHELPS ET AL
COTTON PICKING MACHINE
Filed Feb. 23, 1923
1,646,594
10 Sheets-Sheet 10
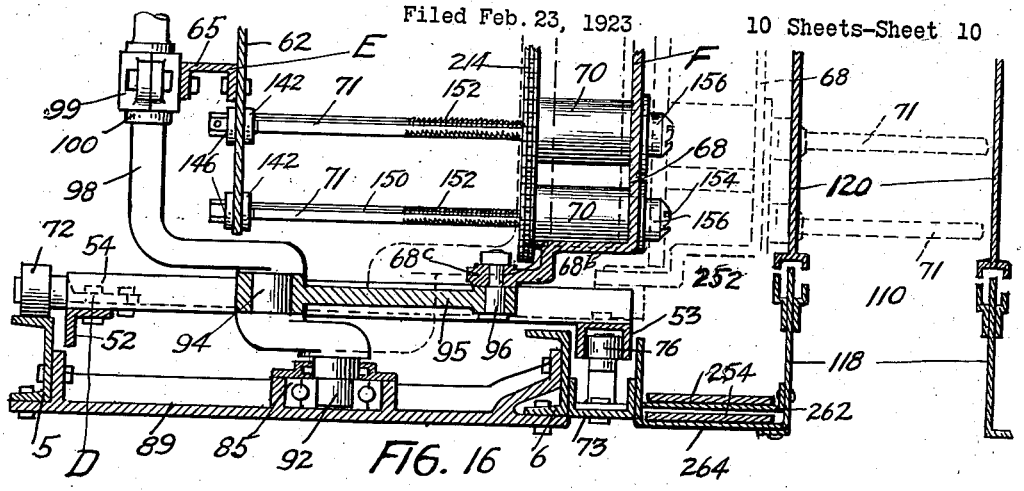
FIG. 16
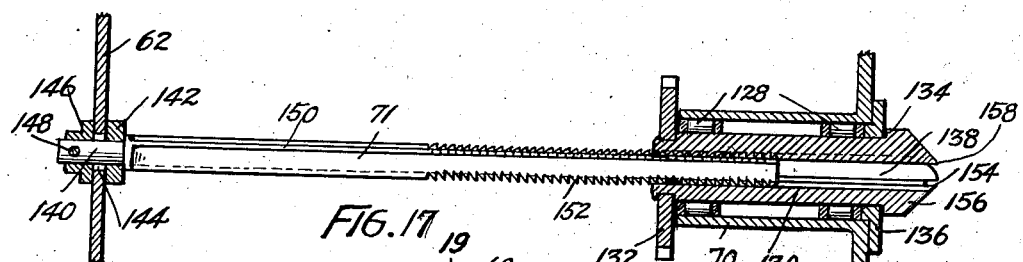
FIG. 17
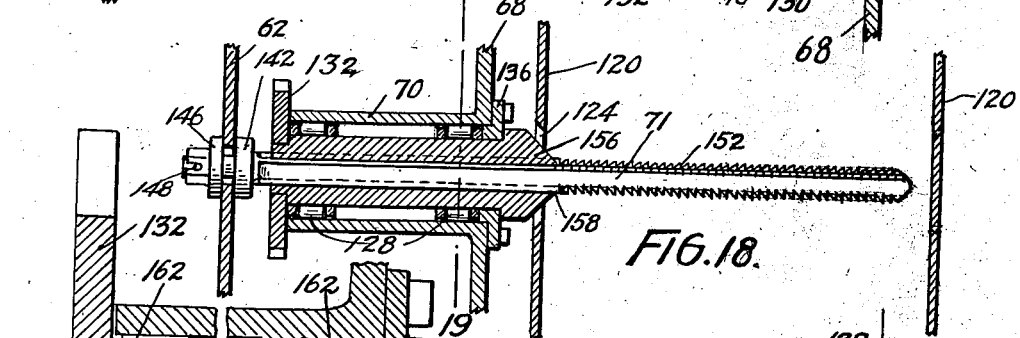
FIG. 18.
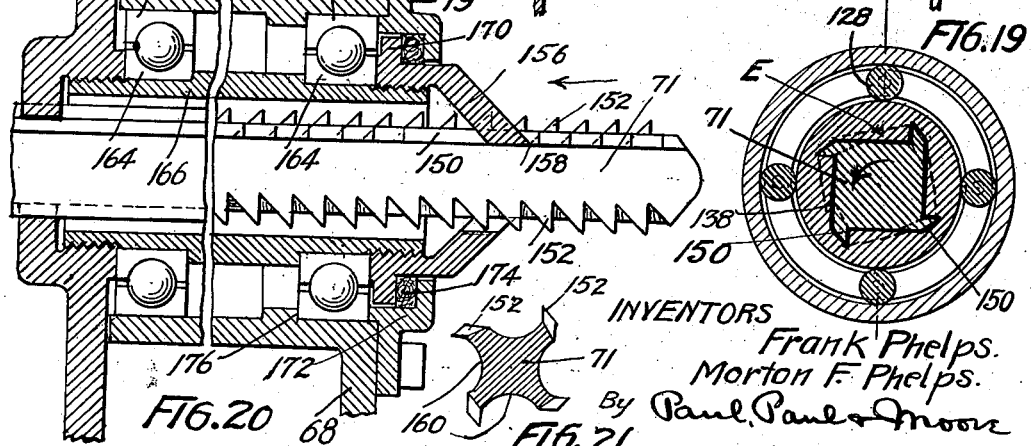
FIG. 19
FIG. 20
FIG. 21
INVENTORS
Frank Phelps.
Morton F. Phelps.
By Paul, Paul & Moore
Their Attorneys Patented Oct. 25, 1927.

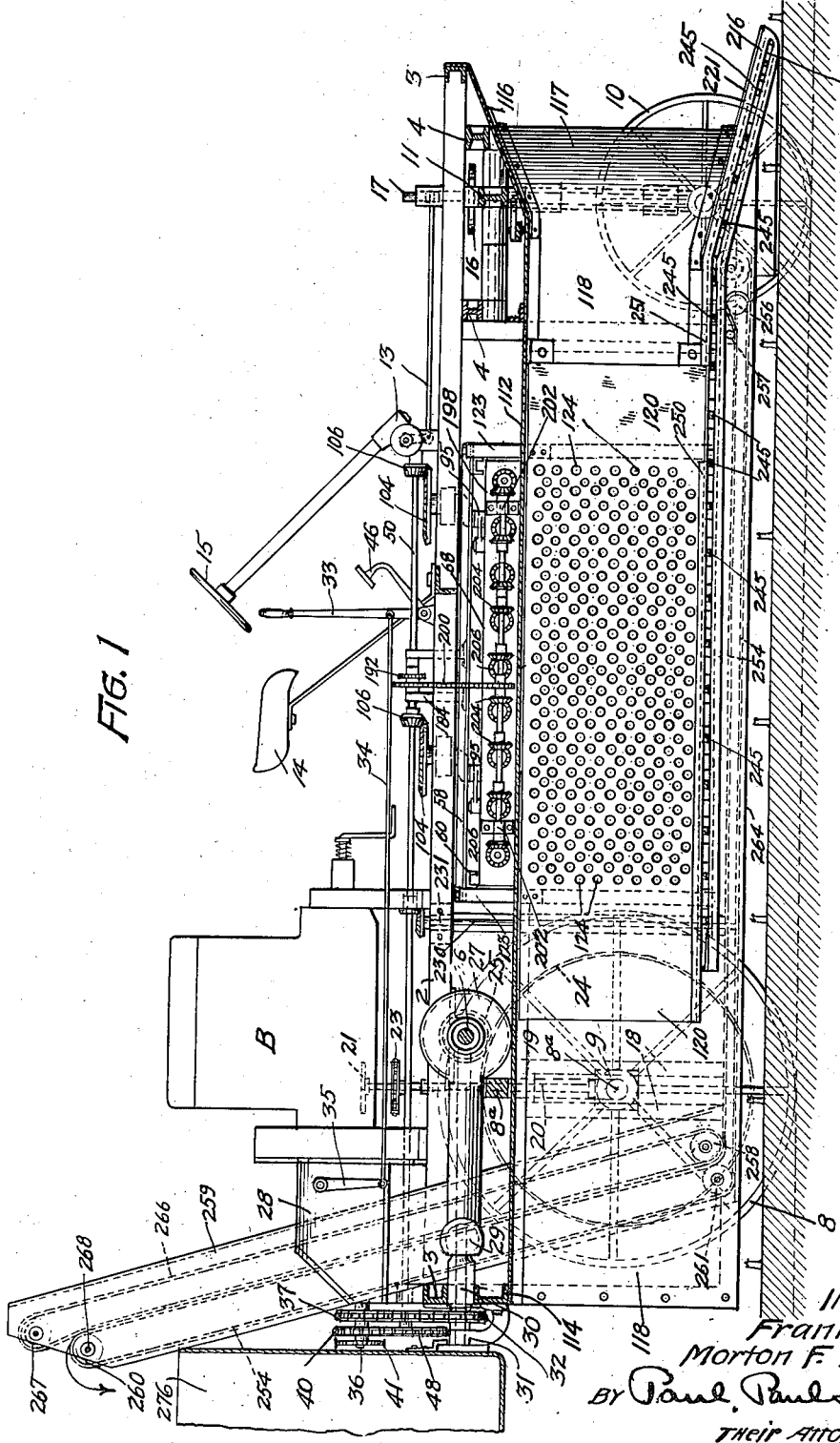

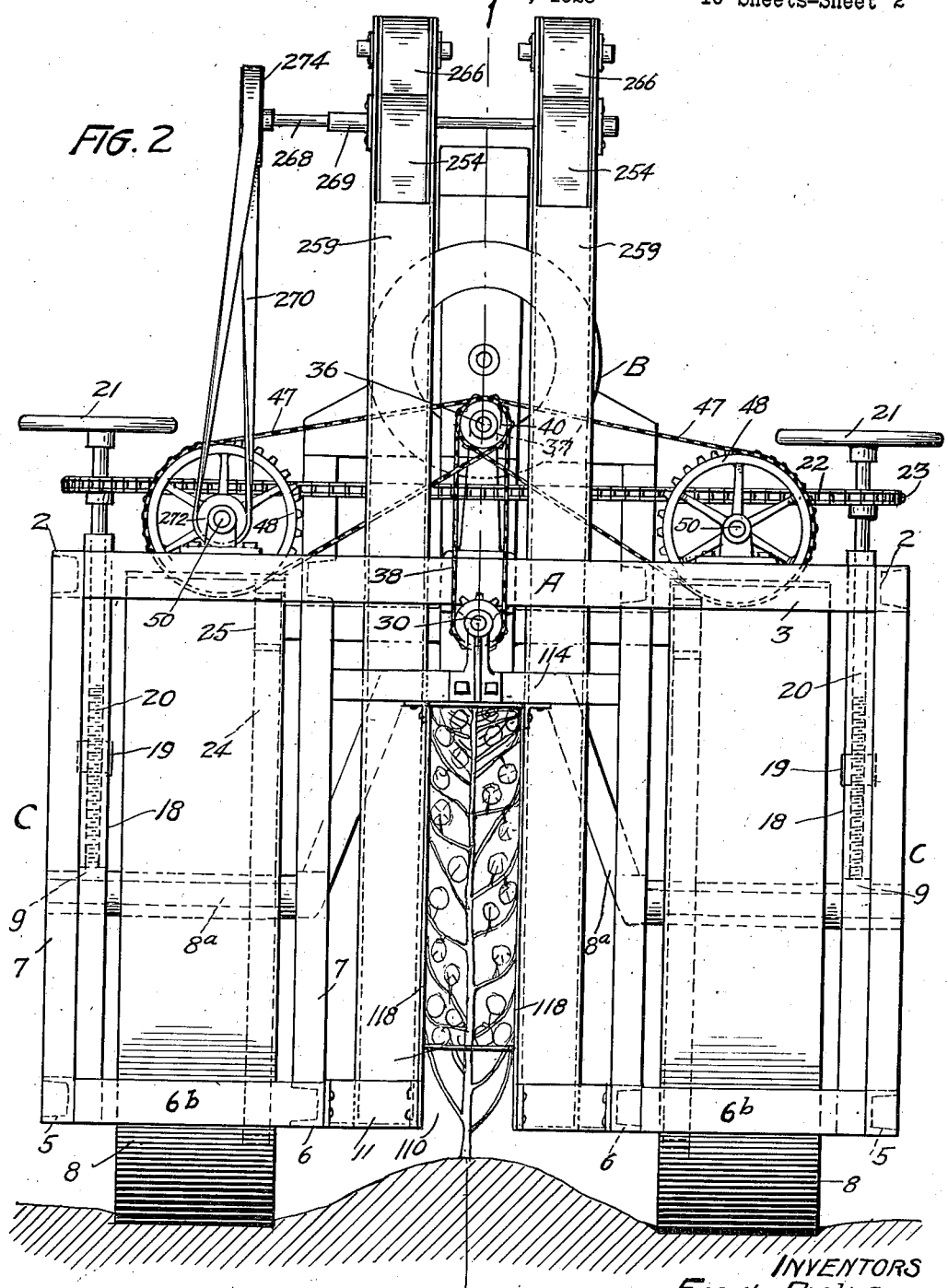

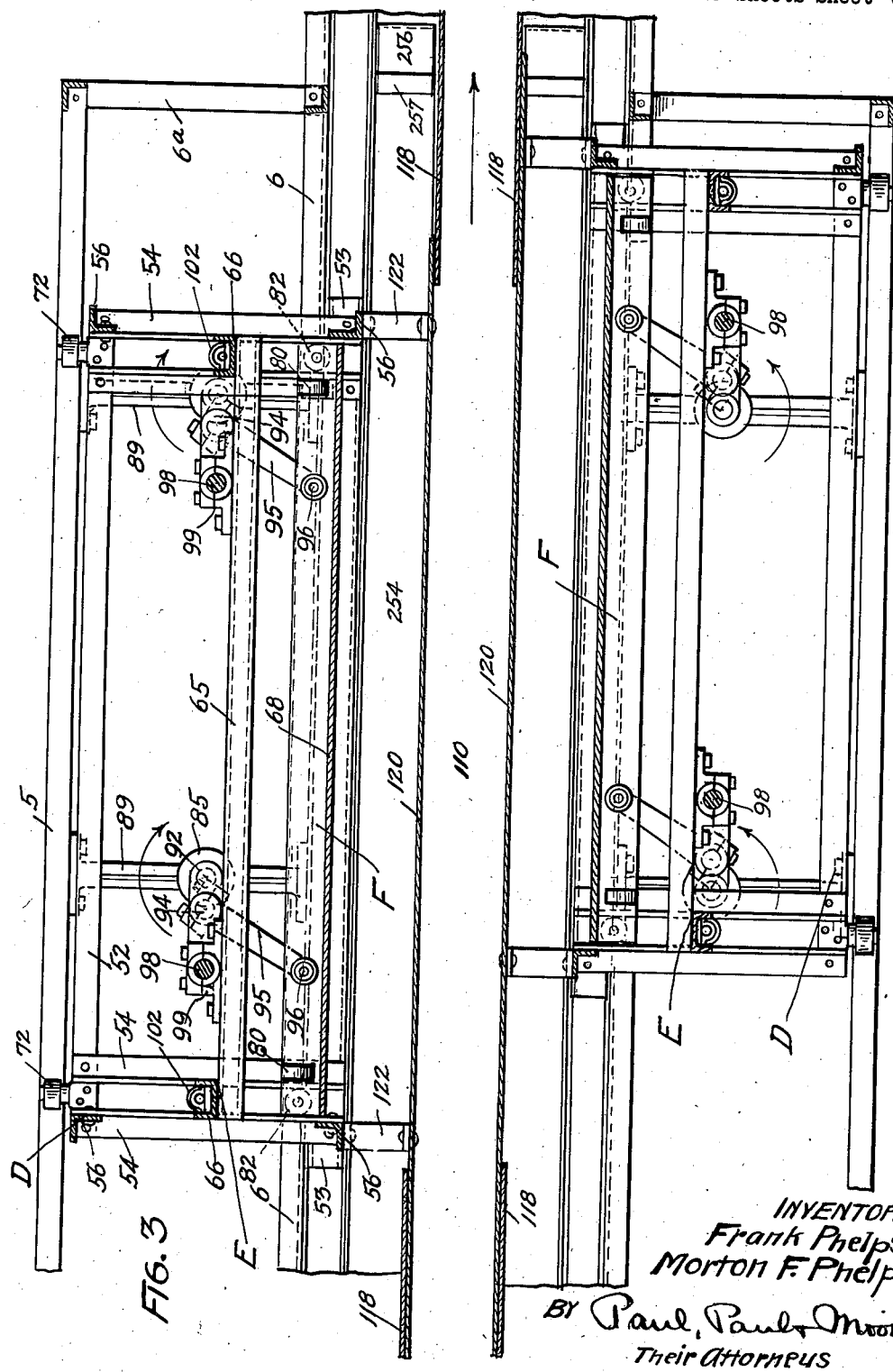

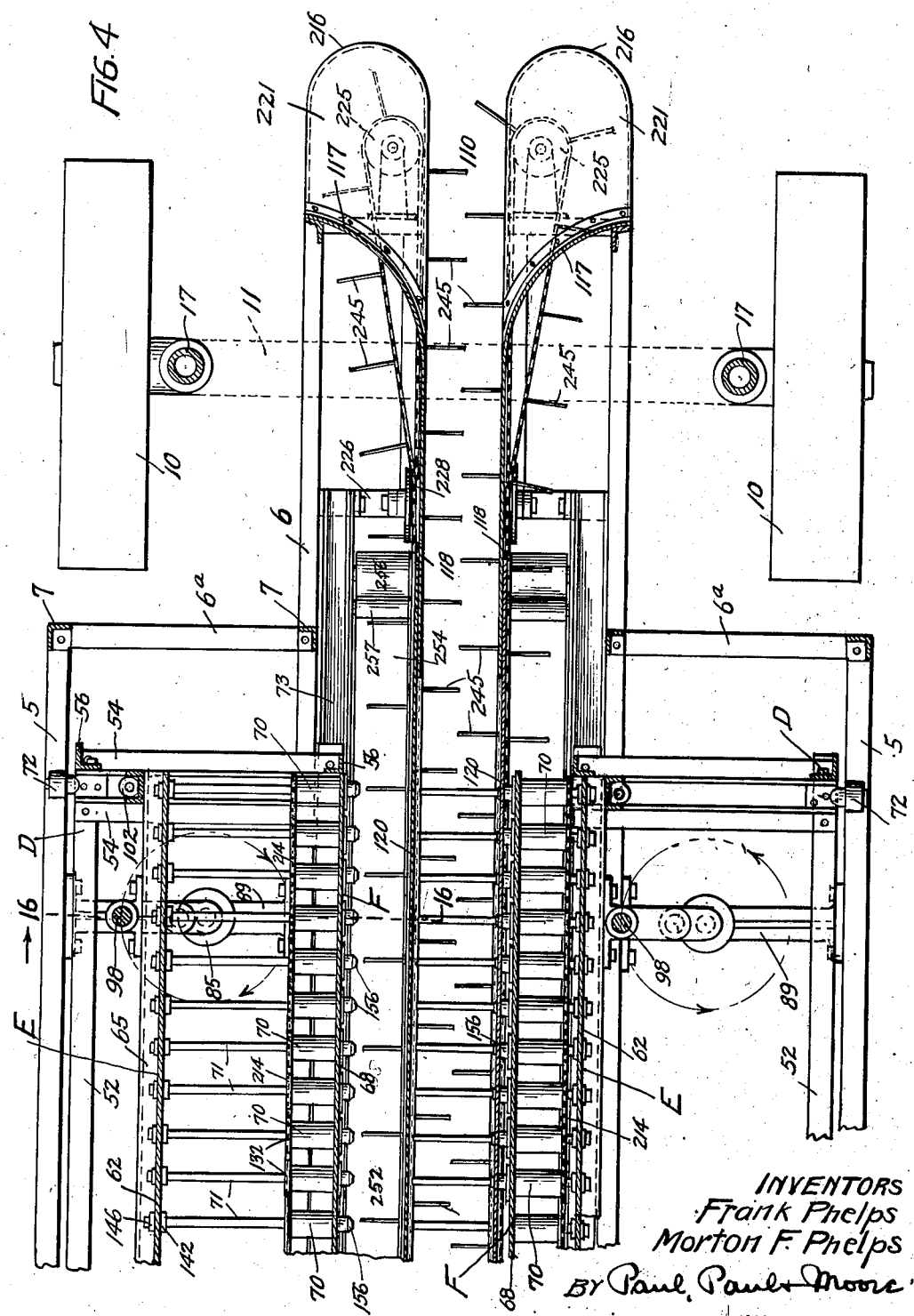

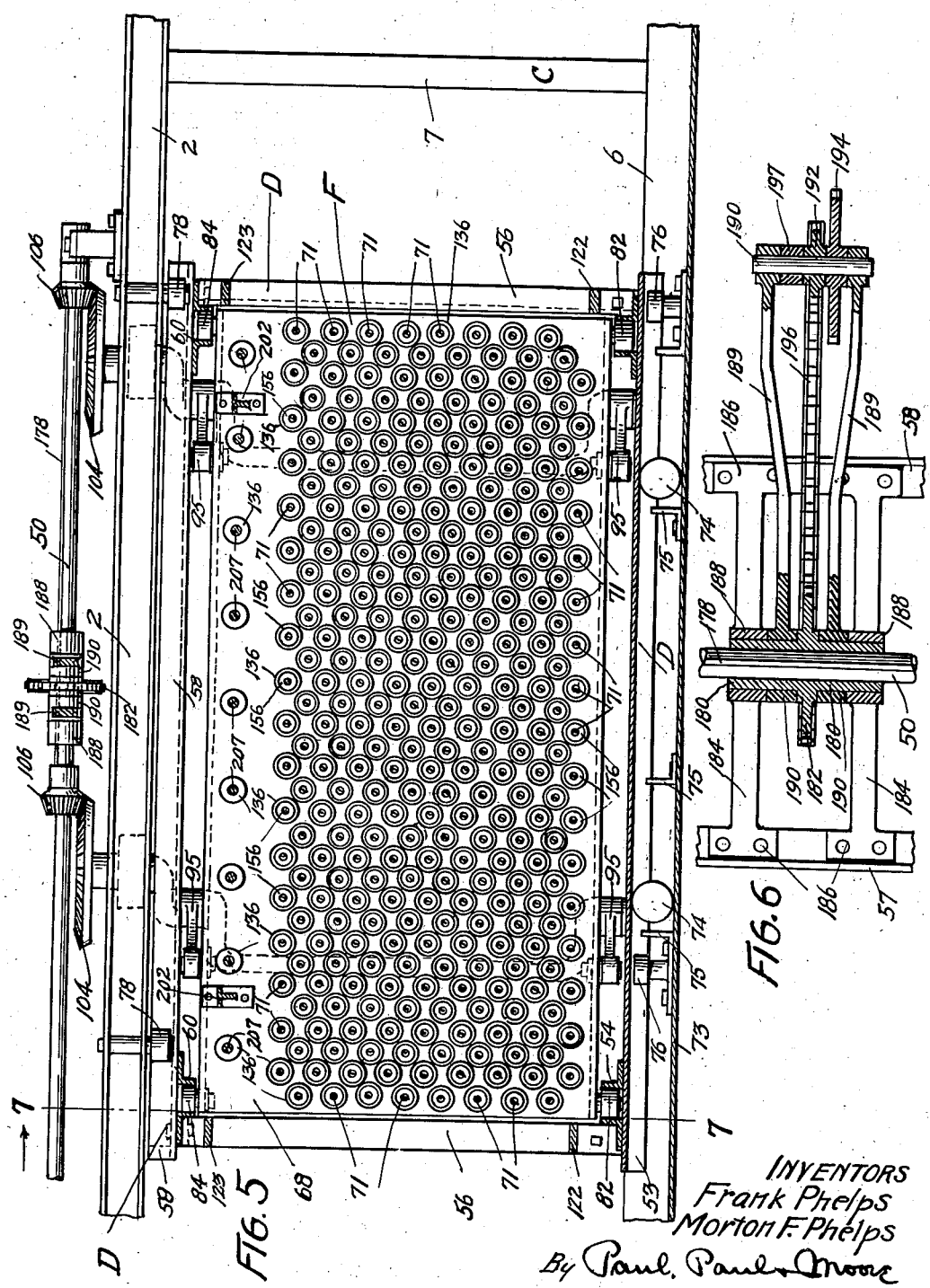

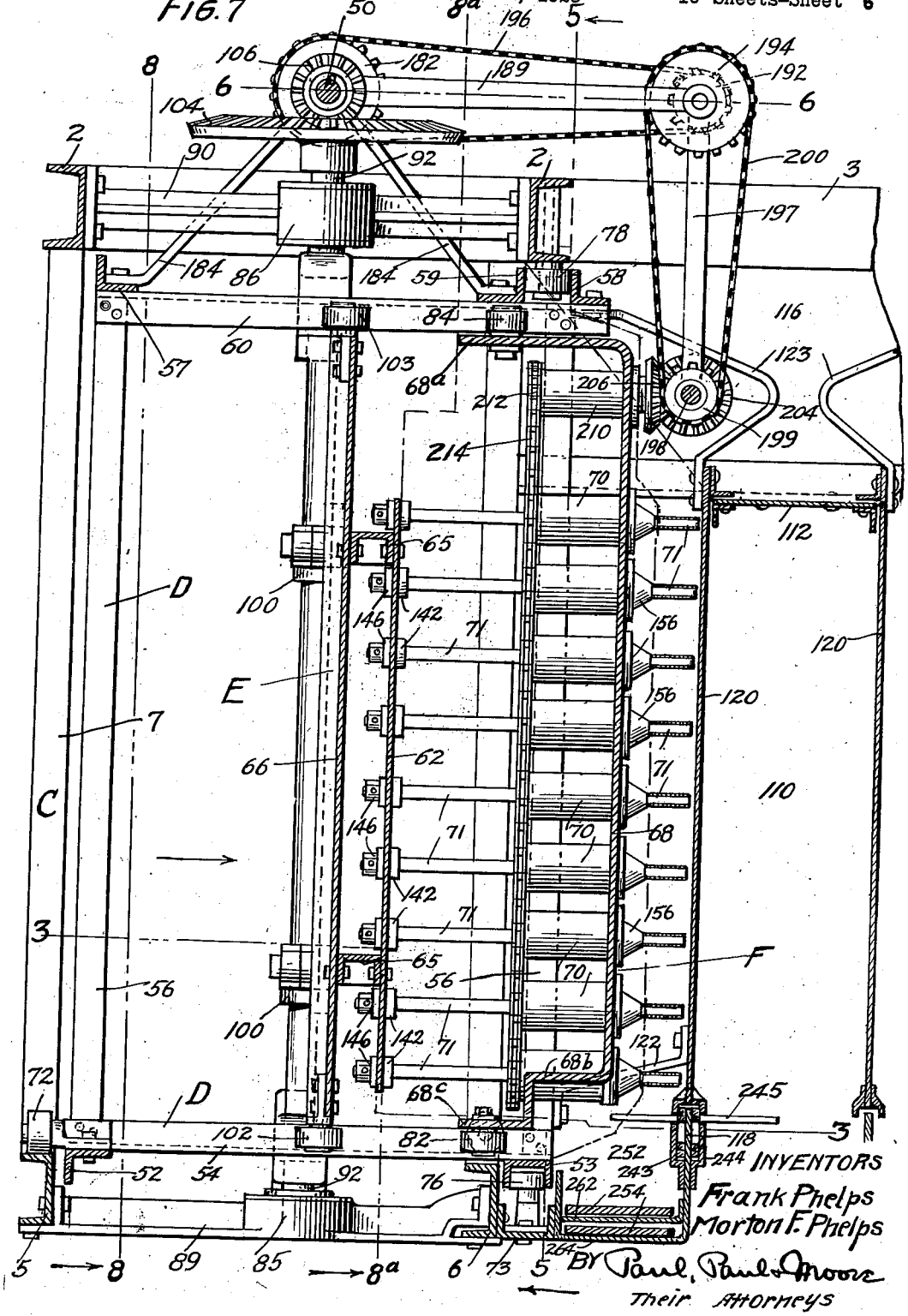

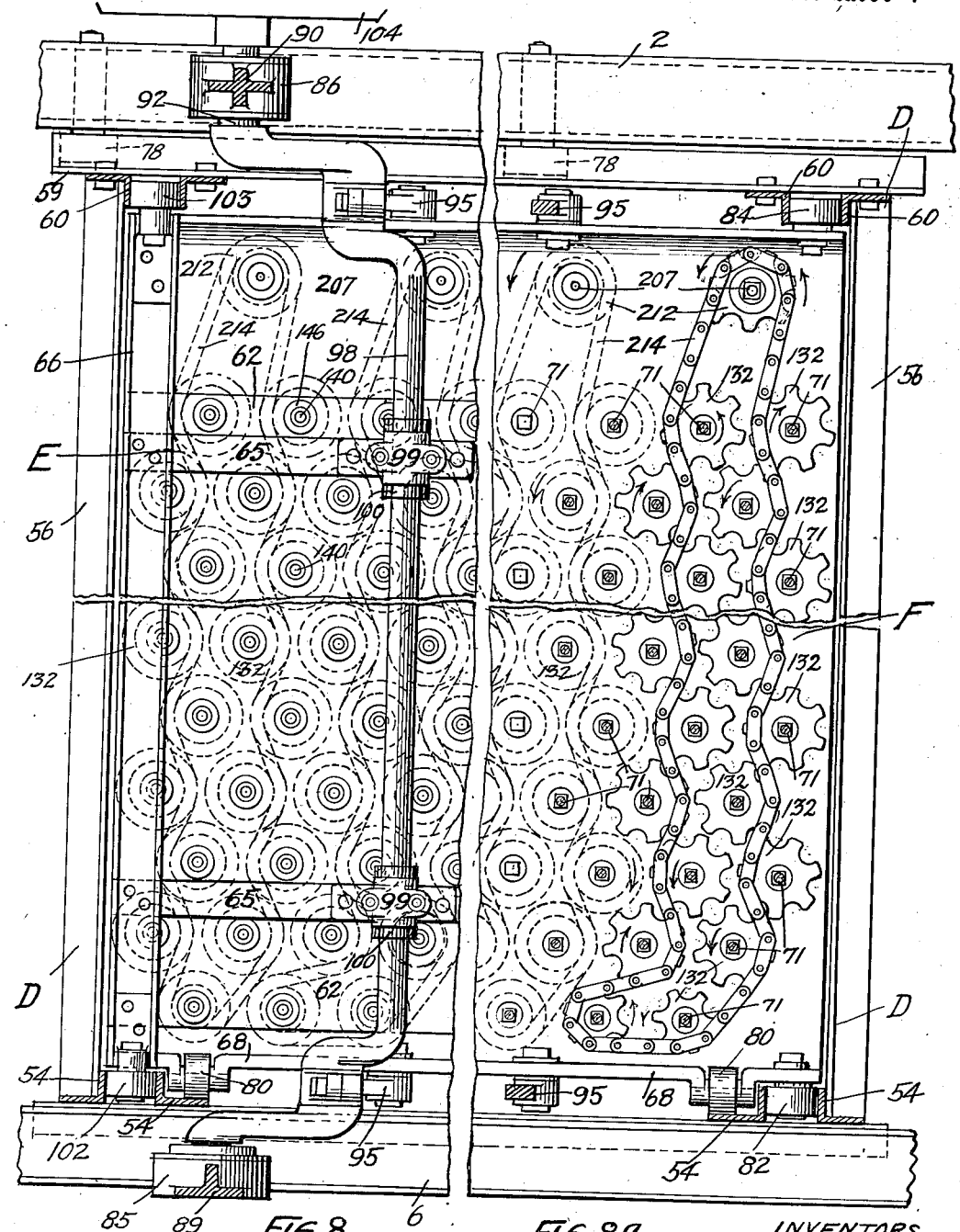

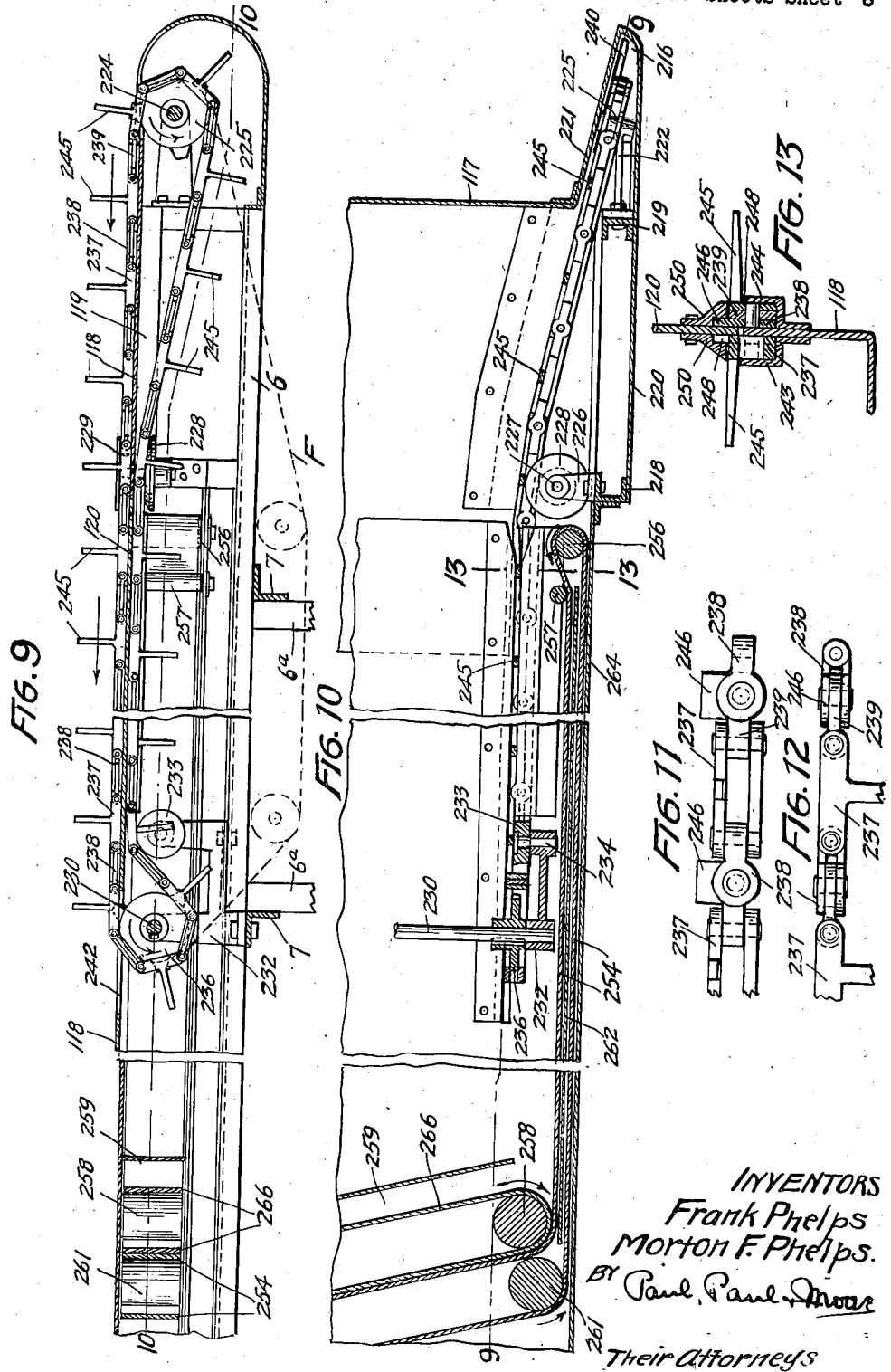
Oct. 25, 1927.  
F. PHELPS ET AL  
COTTON PICKING MACHINE  
Filed Feb. 23, 1923  
1,646,594  
10 Sheets-Sheet 8
INVENTORS  
Frank Phelps  
Morton F. Phelps.  
BY  
Their Attorneys

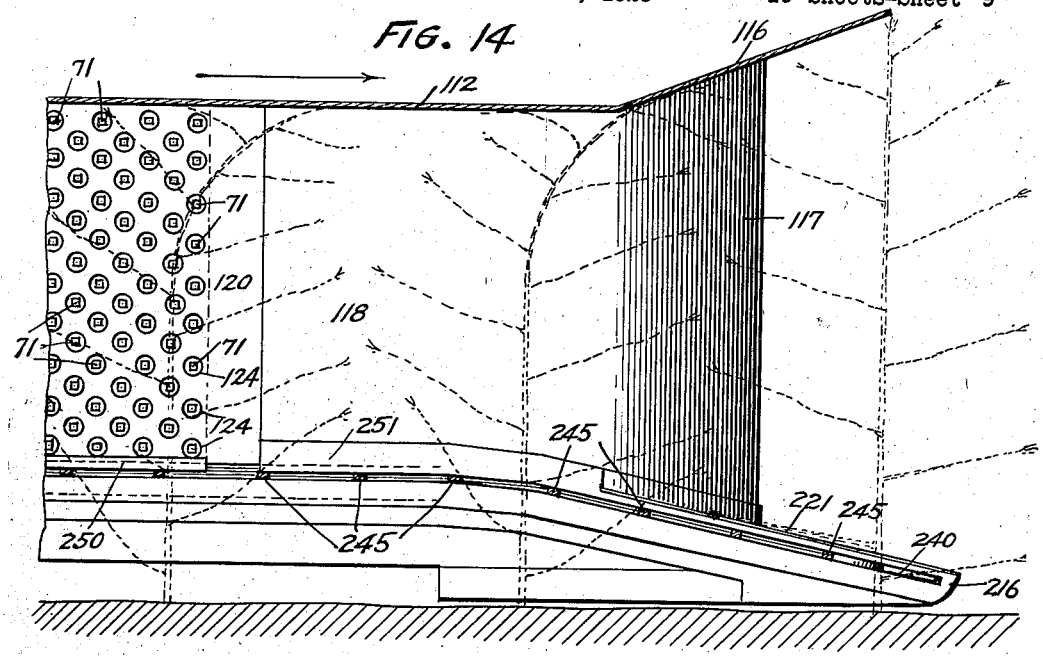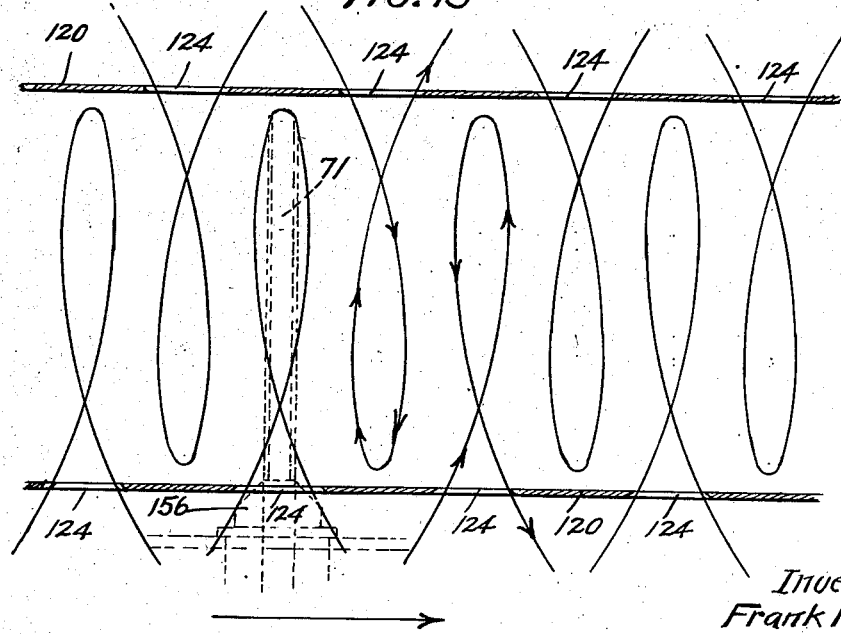

1,646,594

UNITED STATES PATENT OFFICE.

FRANK PHELPS AND MORTON F. PHELPS, OF LITTLE ROCK, ARKANSAS, ASSIGNORS TO PHELPS COTTON PICKER COMPANY, OF LITTLE ROCK, ARKANSAS, A CORPORATION OF ARKANSAS.

COTTON-PICKING MACHINE.

Application filed February 23, 1923. Serial No. 620,690.

Our invention relates to machines for picking or automatically extracting the cotton from the open bolls on cotton plants in the field, and depositing the extracted cotton in suitable receptacles arranged upon the machine.

The general object of our invention is to produce a machine for this purpose that will pick and extract the cotton from all the open bolls on the cotton plants, from the ground to the top of the plants, as the machine passes once over a row of plants, and that will accomplish this with the least amount possible of foreign matter, or "leaf trash" being deposited with the cotton. A further object is to produce a machine of this general accomplishment that will be rapid and efficient in operation, durable, and simple of construction, and inexpensive to manufacture.

We have found by thorough research for the causes underlying the fact that cotton picking machines, in spite of their great labor saving possibilities, have not as yet come into practical use, is the inability of the machines, as heretofore constructed, to efficiently and completely, in one operation, pick and extract the cotton from all the open bolls, from the ground to the top of the cotton plants, leaving instead a considerable number of unpicked bolls on the plants.

Other contributing causes are to be found in high production cost and faulty mechanical design and workmanship.

A particularly serious defect in cotton picking machines, as heretofore constructed, has been their inability to pick cotton from the lower branches on the cotton stalks, and this defect, added to inefficient picking capacity for the upper portion of the plants, has resulted in leaving a large number of unpicked cotton bolls to be either picked by hand or wasted. The number of these unpicked bolls has been largely increased by the fact that in order to collect the picked cotton it has been found necessary to provide a conveyor below the cotton picking spindles into which the cotton drops after having been stripped from the spindles. This conveyor and the necessary ground clearance below it, taken together, require considerable space, so that a large number of the bolls will be below and totally out of reach of the picking spindles.

The inefficient picking and failure to extract the cotton from all the open bolls, higher on the plants and in the direct path of the picking spindles, is generally due:

First, to a failure of the spindles to reach all points in the picking area, and to contact with all the bolls, and Second, to failure to firmly attach the cotton to the spindles when actually in contact.

Failure of contact results from partial and infrequent projection of the spindles across the tunnel space of the machine in which the cotton plants are confined; an insufficient number, and improper spacing of the spindles, and incorrect positions and movements of the spindles when projected between the cotton stalks in the tunnel.

Failure of attachment is the result of faulty construction of the spindles and intermittent and slow rotation thereof, and of imperfect stripping of the spindles, the cotton left thereon preventing other cotton becoming attached thereto.

The main objects of our invention are, therefore, specifically to design, construct and embody in a cotton picking machine, in the simplest forms, mechanical means and improvements which shall remove the causes, defects and failures of prior machines as they have been analyzed above.

For the purpose of smoothness in operation, speed and durability, we preferably eliminate all cams, and intermittent, irregular movements of the working parts and actuate the spindles and spindle frames by rotary and eccentric movements exclusively.

For the purpose of making the picking spindles effective, both for catching and stripping the cotton, we preferably construct them of one-piece steel bars, substantially square in cross section, but having on each corner projecting picking teeth, pointing outward and forward, and beveled transversely, at an angle, to form sharp points on their forward ends, the beveled edges of the teeth pointing transversely of the axis and in the direction of rotation of the spindles.

By this novel construction, which will hereinafter be more fully described in detail, the slightest contact of a spindle with the cotton, will firmly attach the cotton to the teeth of the spindle, to be wound thereon and extracted from the open cotton boll.

The spindles are preferably driven from a motor at a high, rotary speed, by positive gearing, which insures the instant extraction of the cotton from the bolls when caught by the spindles. The forward pointing teeth, and square sides of the spindles, insure the stripping of cotton from the spindles, as will hereinafter more fully appear.

To positively reach every point in the cotton boll area with the picking spindles, we group the spindles closely together, preferably in staggered relation, in two spindle units, operating on opposite sides of the cotton rows, and alternately project the spindles between the cotton stalks and branches, substantially to the opposite wall of the narrow traveling tunnel, into which the cotton plants are contracted, and in which they are confined, while passed over by the machine. As the spindles pass between the stalks, they describe horizontally reversing oscillating paths, relative to the cotton stalks, which carry the rotating spindles to substantially every point, horizontally, between the stalks. To further insure the passage of the spindles through all points between the stalks, vertically as well as horizontally, the relative speed of the oscillations of the spindle units to the forward movement of the machine, is such that picking spindles are caused to pass a number of times through, or near, the same space between the stalks.

Attention is particularly called to the fact that the passage of the picking spindles, alternately, from opposite sides, completely across to the opposite wall of the picking tunnel, practically doubles the picking area covered by the spindles at each passage, as compared with spindles projected only to the center of the tunnel. This complete cross tunnel passage of the spindles is made practical of attainment by means of spindle bearings in the stripper heads arranged in a carrier movable independently of the oscillating spindle carrier in a cross-tunnel horizontal direction. This construction, as will hereinafter be fully pointed out, insures a firm support for the extended spindles, and at the same time, facilitates stripping.

By these novel constructions, movements and operations, every point of space in the picking tunnel between the stalks is touched by the picking spindles from the level of the lowest tier of spindles upward, several times in succession, and the cotton in every open boll, existing in this zone, is attracted by the rapidly and positively rotating spindles.

For the purpose of completely picking the bolls on branches of the stalks situated below the level of the picking spindles, we provide means for raising, and retaining in a raised position until the spindles have passed, all the cotton branches situated under this level, whereby these branches, and the bolls grown thereon, will be subjected to the movements and operation of the picking spindles above stated.

The raising and retaining elements consist of two endless carriers, located closely to the lower tier of spindles, passing rearwardly of the tunnel of the machine, moving at substantially the speed that the machine is traveling forward, and descending gradually at the front end of the machine to a point near the ground, where a shoe is provided for each carrier, which picks up and elevates the cross branches, while a series of horizontal carrier flights pass under and raise the branches between the stalks. Curved shields are provided for each shoe, which deflect the branches of the stalks to the narrow confines of the tunnel, as the machine advances, bending the cross branches forward over the horizontal carrier flights, which then continue to carry, both the cross branches, and the longitudinal branches, in an elevated position in the path of the lower tiers of picking spindles for the picking of the bolls.

Our invention consists generally in certain constructions and combinations, as hereinafter described in the specification and particularly pointed out in the claims.

In the accompanying drawings, forming a part of this specification:

Figure 1 is a longitudinal section of a machine constructed in accordance with our invention, the section being generally taken on the line 1—1 of Figure 2;

Figure 2 is a rear elevation of the machine on a larger scale;

Figure 3 is a horizontal section of a part of the machine, showing the means for reciprocating carriers, the section being generally taken on the line 3—3 of Figure 7;

Figure 4 is a plan sectional view of the front end of the machine showing the spindle carriers in an advanced position from that shown in Figures 1, 3 and 5;

Figure 5 is a vertical longitudinal section of one of the spindle carriers—the section being generally taken on the line 5—5 of Figure 7;

Figure 6 is a detail, horizontal section on the line 6—6 of Figure 7;

Figure 7 is a vertical cross section on a larger scale on the line 7—7 of Figure 5;

Figure 8 is a vertical longitudinal section on the lines 8—8 of Figure 7, showing particularly the method of supporting and moving the spindle and stripper head carriers;

Figure 8ª is a similar section on the line 8ª—8ª of Figure 7 showing the method of grouping and driving the spindles;

Figure 9 is a horizontal sectional view on the line 9—9 of Figure 10, illustrating the method and means of elevating and retaining, in an elevated position for picking, the lower branches of the cotton stalks;

Figure 10 is a vertical section on the line

10—10 of Figure 9, also showing the method and means of conveying the picked cotton;

Figures 11 and 12 are detail views of a section of the endless carrier shown in Figures 9 and 10;

Figure 13 is a cross section on the line 13—13 of Figure 10;

Figure 14 is a vertical sectional view of the front end of the machine, illustrating how the lower cotton branches are raised to a high position for picking;

Figure 15 is a view illustrating the oppositely and reversely crossing curves described by the picking spindles when projected between the cotton stalks;

Figure 16 is a vertical cross section on the line 16—16 of Figure 4, showing the movable bearings for the spindles, formed by the stripper heads;

Figures 17 and 18 are detail sectional views of one of the spindles and its supporting movable stripper heads showing how the head is moved forward with the spindle, and supports it when projected;

Figure 19 is a detail sectional view on a large scale, on the line 19—19 of Figure 18, and Figure 20 is a section through one of the stripper heads on a large scale, showing a modified anti-friction bearing for said stripper head;

Figure 21 is a cross section of a modified concave formed spindle.

*The main carriage frame.*

Referring to Figures 1 to 4 of the drawings it will be seen that the machine is composed substantially of right and left hand sections, substantially identical in construction and operation, and adapted to travel on opposite sides of a row of cotton plants. The machine comprises a carriage, formed of an upper horizontal frame member A, carrying a suitable power plant B, and vertical right and left-hand side members C, C, depending from the frame member A. The frame member A is constructed of longitudinal girders 2, rigidly connected by cross girders 3 and 4, and the frame members C are each constructed of longitudinal bars 5 and 6, rigidly connected to the bars 2 by vertical struts 7. The rear of the carriage frame is preferably supported by an arched axle 8ª mounted in bearings 9 in the frame members C, said axle having traction wheels mounted thereon. The front portion of the carriage frame is supported upon the steering wheels 10 which are mounted on an arched axle 11, suitably connected, as by a horizontal pivot, to the cross girders 4 of the frame member A (Figure 1). Suitable steering mechanism 13, not shown in detail, operable from the driver's seat 14 by means of a hand wheel 15, is provided for the front wheels 10, by means of which the machine may be guided. The front end of the carriage frame may be vertically adjusted by means of suitable hand wheels 16, threaded on the vertical steering rods 17, or by other suitable means. The rear end of the carriage frame is preferably made vertically adjustable by bearing blocks 9 arranged between vertical guide posts 18 and resting upon the ends of the axle 8ª. Internally threaded blocks 19, secured to the guide posts 18, are also arranged between said guide posts, and threaded rods 20, passing through the blocks 19 have their lower ends engaging the bearing blocks 9. Suitable hand operated wheels 21 are provided at the upper ends of the threaded rods 20, whereby the carriage frame may be raised or lowered by operating said hand wheels, and thereby moving vertically the threaded blocks 19 and the frame to which said blocks are secured. Connecting chains 22 pass around sprocket wheels 23 on the rods 20, so that by turning either hand wheel 21 both sides of the machine will be simultaneously adjusted.

*The driving mechanism.*

The traction wheels 8 are provided with the usual bull gears (indicated in Figure 1 by dotted lines 24). These gears are in mesh with driving pinions (indicated in Figure 1 by dotted lines 25), which are mounted on shafts 26, having bearings in a differential gear casing 27. This casing is secured to the axle 8ª by suitable bearings, and carries the usual differential gearing and driving shaft 29, connected by means of a suitable coupling to a short transmission shaft 30 supported in suitable bearings 31 on the frame member A, and carrying a sprocket wheel 32 (Figure 1). The power plant B, preferably of the internal combustion engine type, is preferably provided with a speed change gear box of any preferred or standard type, and the speed changes are controllable from the driver's seat by means of a hand lever 33, connecting rod 34, and rocker arm 35. The engine power shaft 36 is provided with a sprocket wheel 37, and power is transmitted from this sprocket wheel to the shaft 30 by means of a chain belt 38. In order to maintain a definite relationship between the speed at which the machine may be driven over the ground, by the above described means, and the speed of the cotton picking mechanism, hereinafter described, we prefer to drive the picking mechanism from the same shaft 30 that transmits power to the traction wheels. We, therefore, provide driving sprocket wheels 40 and 41, on the shaft 36, which, through sprocket chains 47, transmit power from the shaft 36 to sprocket wheels 48, carried by the main operating shafts 50 of the cotton picking mechanism. The shafts 50 extend lengthwise of the machine at each side thereof, and are supported by suitable standards on the carriage frame member A. (Figures 1 and 2.)

As the two operating units of this mechanism are identical in construction and mode of operation the left hand unit will principally be referred to in the following detailed description, the same reference numerals when used on the drawings of both units representing identical parts.

*The spindle supporting and moving devices.*

To support the set of spindles at each side of the machine, and move the same into and out of position to engage the cotton on the plant we prefer to provide a longitudinally reciprocating frame unit, and two transversely reciprocating carrier units. The frame unit, which may appropriately be termed a main supporting frame, is arranged to reciprocate longitudinally of the carriage frame, but without any transverse movement thereon. This frame, designated as a whole by the reference letter D, is preferably composed, in skeleton form, of lower longitudinal bars 52 and 53 (the bar 52 being here shown as an inverted angle bar, and the bar 53 as an inverted channel bar), connected by cross bars 54, vertical corner posts 56, and upper longitudinal bars 57, 58 and 59 connected by cross bars 60 (Figure 7).

The frame D is movable on the longitudinal bar 5 of the carriage frame on which it is supported by rollers 72, and on a longitudinally extending channel bar 73, on which it is supported by rollers 74. The longitudinal motions of said frame are preferably limited by stops 75, provided on the channel bars 73, (Figures 5 and 7). Said channel bars 73 are preferably secured to the longitudinal bars 6 (Figure 7). This frame is preferably guided in its reciprocating movements, by the lower rollers 76 engaging the channel bar 53, and by the upper rollers 78, arranged to travel between the bars 58 and 59 (Figure 7).

A second unit which may appropriately be termed a spindle carrier, and which, as a whole, is herein designated by the reference letter E, is arranged to reciprocate transversely in the main supporting frame D. Being mounted in the main supporting frame it reciprocates longitudinally therewith. The carrier E preferably consists of vertical channel bars 66 provided, at their lower ends, with rollers 102 arranged between the transverse bars 54, and at their upper ends with rollers 103 arranged between the transverse bars 60, (Figure 8); horizontal channel bars 65, secured to said bars 66, and a vertical plate 62, secured to the bars 65 (Figure 7).

The third unit, which may appropriately be termed a stripper-head carrier, and which as a whole is herein designated by the reference letter F, consists mainly of a vertical plate 68 having upper and lower horizontal extensions 68ᵃ, 68ᵇ, and 68ᶜ. Rollers 82, secured to the extension 68ᶜ, are arranged in the channel between the cross bars 54, and rollers 84, mounted on the extension 68ᵃ, are arranged in the channel between the cross bars 60. The vertical plate 68 is provided with a series of preferably cylindrical housings 70, in which the stripper heads are mounted, as hereinafter described. The housings 70 project from the plate 68 towards the spindle carrier. Said housing may be formed integrally with the plate 68, or may be formed separately and secured thereto. (Figures 17, 18 and 20.)

*The frame and carrier moving mechanism.*

Suitable cross bars 89 extend between the lower bars 5 and 6, and similar bars 90 extend between the upper bars 2, 2 one of said cross bars being located near each end of the main supporting frame D. Mounted in suitable anti-friction bearings 85 and 86, arranged in said cross bars, are the vertical crank shafts 92 (Figure 8), provided for moving the frame D and the carriers E and F. Crank pins 94 (Figures 3 and 16) are formed on the crank shaft 92, substantially opposite the upper and lower edges of the stripper head carrier F, and connecting rods 95 connect said crank pins 94 with pins 96 provided in the horizontal extensions 68ᵃ and 68ᶜ of the vertical plate 68 (Figures 7 and 16.)

The spindle carrier E is connected to the main cranks 98 of the shafts 92 by the engagement of said cranks with bearings 99 on the horizontal bars 65 of the spindle carrier. As the spindle carrier is preferably comparatively light we have shown it supported on collars 100 on the main cranks 98. Other vertical supports for this carrier may obviously be provided. The crank pins 94 are arranged preferably in parallel relation to the crank shafts 92 and 98, and both cranks 98 are adjusted in the same position in the circle of revolution (Figure 3) and geared to run at the same speed by means of the beveled gears 104, on the crank shaft 92, and beveled pinions 106 on the driving shaft.

It will be seen that as the crank shafts 92 are rotated the spindle carrier E, connected to the cranks 98, will, moving with said cranks, be given a circular or gyrating movement, and, as said carrier E moves, its rollers 102 and 103 will allow the main supporting frame D to reciprocate longitudinally of the carriage frame, guided by the stationary rollers 76 and 78, and supported by the rollers 72 and 74. The rotation of the cranks 98 will cause the spindle carrier E to reciprocate transversely in the main supporting frame D, as hereinbefore stated, thereby reciprocating the spindles crosswise of the plant receiving tunnel of the machine, while at the same time the connecting rods 95 will, through the crank pins 94, cause the stripper head carrier F also to reciprocate transversely of the main supporting frame, the extent of its travel, however, being less than that of the spindle carrier E.

It will be seen, therefore, that the spindle carrier E and the stripper head carrier F, both being mounted in the frame D will partake of its longitudinal movements, while both of said carriers will reciprocate transversely of the frame D, the movement of the spindle carrier being greater than that of the stripper head carrier.

By the described operation of the frame D and the carriers E and F, we are able to project the cotton picking spindles 71 a maximum distance across, or by, a cotton plant, while firmly supporting said spindles near the plants, by the stripper heads, which are projected towards the plants with the spindles. The reverse movement of the carriers also retracts the stripper heads, with the spindles, a sufficient distance to provide stripping space above the conveyor, thereby enabling the cotton, as it is stripped from the spindles, to drop upon the conveyor, as hereinafter described.

*The cotton picking space or tunnel.*

Between the two opposed cotton picking units of the machine is a narrow passageway 110, which for convenience we designate a cotton confining space or tunnel, in which the cotton plants are confined while the cotton is being picked. The top of this space is formed by a plate 112 supported at its rear end by a cross bar 114, that also preferably supports the bearings for the shaft 30 (Figure 2). At the front end of the machine the plate 112 has an upwardly flaring end portion 116, that is preferably fastened to the cross girder 3 of the frame member A.

The sides of the cotton picking space or tunnel are formed partially by stationary plates or walls 118, supported on the carriage frame in any suitable or preferred manner. At each side of the cotton picking space or tunnel a large opening is provided between the ends of the forward and rear plates 118. These openings are covered by plates 120, fastened by brackets 122 and 123 to the longitudinally reciprocating frames D, the ends of the plates 120 overlapping the stationary plates 118 (Figures 1 and 3). The plates 120, therefore, have a forward and backward movement with the main supporting frames D, and these plates, 120, form movable side walls for the cotton picking space or tunnel; each of the plates 120 being provided with a series of openings 124, through which the spindles may be projected into or withdrawn from the cotton picking space or tunnel. The plates 120, therefore, have a forward and backward movement with the frame D, and they also form movable side walls for the cotton picking space or tunnel in which the cotton plants are held in compact form while the cotton is being removed from the plants by the mechanism herein described.

*The spindles and the stripper heads.*

Each of the spindles 71 is preferably a bar having a general rectangular form, with a reduced end section 140, forming a shoulder against which an actuating collar or washer 142 is preferably pressed. The end section 140 projects through a hole 144, in the spindle carrier plate 62, and is, on the other side of the plate, provided with an actuating nut or washer 146, preferably locked to the spindle by a pin 148. By this means the picking spindle 71, actuated by the movement of the carrier E, may be freely reciprocated through the barrel 130 of the stripper head 156, while being rotated at a high speed by the rotation of said stripper head. One construction of the housing 70, spindle 71, and stripper head 156, is illustrated in Figures 17–19. The housing 70, as here shown, is formed integrally with the plate 68, and is provided with roller bearings 128. The barrel 130 of the stripper head 156 is mounted in the bearings 128 in the housing 70 and said barrel is provided at its inner end with a shoulder 134 engaging a retaining plate 136, and at its other end with a sprocket wheel 132. The shoulder 134 and sprocket wheel 132 prevent end movement of the stripper head, which is provided with a substantially rectangular central opening 138 through which the spindle 71 slidably passes, said stripper head and spindle being rotatable together.

Referring particularly to Figures 19 and 20 the picking spindle 71 is provided, at each corner of its rectangular cross section, with a projecting ledge 150, preferably formed by cutting away the intervening metal. The ledges are beveled, as indicated in Figure 19, to a sharp edge in the direction of rotation on the picking portion of the spindle, and sharp pointed teeth 152 are formed of the sharpened ledges, the teeth pointing forward as shown in Figure 20. The forward edges of the teeth are cut substantially at a right angle to the axis of the spindle, while the opposite edges are cut out at an angle backwardly inclined towards the axis. Slots 154 are provided in the barrel 130 of the stripper head 156, corresponding to the ledges 150 in the picking spindle. The forward end of the stripper head is preferably conical in form, the face of the cone coming to sharp edges 158 against the four flat faces of the picking spindle. In the modified form of picking spindle shown in Figure 21, the four faces 160 of the spindle are shaped concave in cross section, and the sharp edges of the conical stripper head are made to conform to this shape. When the sharp points of the rotating picking spindles come in contact with the cotton in the bolls, they catch the cotton and wind it around the body of the spindle. Neutral spaces, indicated by dotted lines G in Figure 19, free from cotton, or having less cotton pressure, caused by the projecting teeth 152, are formed between the faces of the spindle, and the surrounding cotton, into which the sharp forward edges 158 of the stripper head 156 readily enter when the picking spindle is retracted, to strip the cotton from the spindle. The conical form of the stripper head, in combination with the forward and outward bevel of the teeth 152 tends to loosen the cotton from the spindle as the spindle is moving backwards in the direction of the arrow (Figure 20). The concave form of the spindle faces (Figure 21) enlarges the neutral or free space between the surrounding cotton and the inner sharp edges of the stripper head 156 and thereby facilitates the entering, under the cotton, of the stripper head.

In Figure 20, we have illustrated a modified form of stripper head. Outer ball races 162 are mounted in the housing 70, and inner races 164 on a tube 165. The sprocket wheel 132 is fastened to the rear end of the tube 166, and the stripper head 156 is secured to the forward end of the tube, which forms the barrel of the stripper head. The stripper head is here provided with a flange 170 and a retaining plate 172 is secured to the carrier plate 68. A felt packing ring 174 is preferably interposed between the flange 170 and retainer plate 172 to protect the ball bearings. The inward thrust of the stripper head 156, when stripping the cotton, is here opposed by the forward ball races abutting an annular shoulder 176 of the housing, while in the construction shown in Figures 17 and 18 it is opposed by the shoulder 134 reacting against the retainer plate 136.

*The mechanism for rotating the spindles.*

Referring to Figures 6 to 8ª, each driving shaft 50 is provided with a spline 178, fitting a spline way in the hubs 180 of the sprocket wheel 182 arranged slidably upon the bars 57 and 58 of the reciprocating frame D, and are provided with heads 188 in which the opposite ends of the sprocket hubs 180 have bearings. Horizontal distance rods 189, having hubs 190, preferably arranged between the heads 188 and sprocket wheel 182, are pivoted to the hubs of the sprocket wheels, and, extending inward, carry on their inner ends a larger sprocket wheel 194. These sprocket wheels are secured to run in unison and are driven from the main shaft 50 by a sprocket chain 196. A vertical distance rod 197 (Figure 7) is pivoted to the spindle 190' and to a counter driving shaft 198, upon which is mounted a sprocket wheel 199 by which the shaft 198 is driven by means of a chain 200 from the sprocket wheel 194 on the spindle 190. The shaft 198 is mounted in bearings 202 arranged upon the stripper head carrier plate 68 (Figure 1) and carries a series of bevel gears 204 in mesh with bevel gears 206 (Figures 5 and 7) secured to the stub shafts 207 that are mounted in bearings 210 in the stripper head carrier plate 68. The bearings 210 are preferably identical in construction with the stripper head bearings and the stub shafts 207 are provided with sprocket wheels 212 arranged in a vertical plane with the sprocket wheels 132 of the stripper heads. We prefer to mount the horizontal rows of spindles so that the spindles will be in a staggered relation, as shown particularly in Figures 8 and 8ª, the relation being such that four vertical rows of stripper heads and spindles may be driven from each sprocket wheel 212 by a single driving chain 214, as shown in full lines in Figure 8ª, and indicated by dotted lines in Figure 8. It will be noted that each of the two vertical portions or sections of the chain engage the opposite toothed faces of two adjacent vertical rows of sprocket wheels 132, each section of the chain thus driving two vertical rows of stripper heads and spindles in opposite directions as indicated by arrows in Figure 8ª. In the manufacture of the spindles 71 the picking teeth of the spindles are, therefore, formed in right and left handed position, and the spindles are assembled in the machine corresponding to the direction of their rotation.

By this construction and method of driving we are enabled to group the picking spindles closely together, run the spindles at high speed, and, at the same time, by greatly simplifying the driving mechanism of the large number of spindles, lessen the cost of manufacture of the machine.

In operation, the countershaft 198, driven from the main shaft 50 as heretofore described rotates the stub shafts 207 through the bevel gears 204 and 206. As the main frame D carrying the driving mechanism, reciprocates longitudinally of the machine, the sprocket wheel 182 is caused to slide correspondingly on the main driving shaft 50, actuated by the brackets 184. As the stripper head carrier F is reciprocated transversely of the main supporting frame D the distance rods 189 and 197 will oscillate to permit such movement.

*The cotton boll raising mechanism.*

In Figures 9 to 13 we illustrate in detail means whereby the cotton bolls near the ground may be raised to the level of the picking spindles and maintained at this level while the cotton is removed from the bolls.

The forward end of the machine carries at each side of the tunnel opening 110 (see also Figure 4) a forwardly inclined shoe 216, supported by the carrier frame bars 6 and the subsidiary frame bar 119. Cross girders 218 and 219 to which is secured a bottom plate 220, preferably connect the frame bars 6 and 119, and a bracket 222 is secured to the forward cross girder 219 upon which is loosely mounted, by means of an inclined pin 224, a sprocket wheel 225. The girder 218 is provided with a bracket 226 which carries, upon a pin or stud 227, a guiding pulley 228 on the outer side of the tunnel plate 118 and a similar pulley 229 on the inner or tunnel side of the plate 118. As the bottom of the plate 220 generally runs close to the ground it is, at the forward end, preferably curved upwardly as shown in Figure 10 and the end of the shoe 216 is also preferably rounded as shown in Figure 9. The top of the shoe 216 consists of a forwardly inclined plate 221 connected to the flared end 117 of the tunnel plate 118. Preferably in the rear of the spindle frame, as shown in Figures 1, 9 and 10, we mount a vertical shaft 230 journaled above in a bearing 231 indicated by dotted lines in Figure 1 on the upper horizontal frame bar, and having bearings below in a bracket 232 (Figure 9) attached to the frame bars 6 and 7. The bracket 232 preferably also carries an idler or guiding pulley 233, journaled upon a pin 234. A driving sprocket wheel 236 is secured to the shaft 230, and a universally flexible endless chain shown as composed of links 237 and 238 and 239 passes around the sprocket wheel 236 between the idler pulley 233 and the tunnel plate 118, along the inside of the tunnel plate and over the guiding pulley 228, forward and downward to the shoe sprocket wheel 225, around this wheel and out into the tunnel 110 through a slot 240 in the plate 118, then close along this plate upward over the guide pulley 229, from thence horizontally and, through a slot 242 in the plate 118 back to the driving sprocket wheel 236. The carrier chain is preferably supported in channels formed by the plate 118 and angle bars 243 and 244 as shown in Figure 13, and is provided with horizontally disposed lugs 245 projecting into the tunnel 110. To obviate bending or tilting of the chain we prefer to provide the links 238 with upstanding guiding lugs 246 traveling in grooves 248 in the upper guide bars 250. These upper guide bars are secured to the movable tunnel plate 120, except at the front portion of the carrier where the upper guide bar 251 is fastened to the stationary plate 118 as clearly shown in Figure 1.

The carrier chain may be of any suitable construction, but we have shown it to consist of ordinary chain links 237, provided with the carrying lugs 245 and the special links 238, jointed universally, by means of the links 239, to the links 237 and provided with a guiding lug 246. It will be understood that the useful work of the carrier chain is accomplished exclusively in the tunnel by the rearward running part of the chain, and while we have shown the forwardly running or idle part of the carrier chain arranged along the side of the tunnel plate, it is evident that the chain might be run idle in a different path between the sprocket wheels 225 and 236, as for example as indicated by dotted lines in Figure 9. Nor do we confine ourselves to the position of the chain as shown in the tunnel below the lowest tier of picking spindles, as it is evident that the chain might be arranged higher up between any suitable horizontal tiers or rows of spindles.

*The cotton collectors and conveyors.*

Referring now to Figures 4 and 16, a cotton stripping and collecting chamber 252 is formed between the tunnel plate 120 and stripper head carrier plate 68 when the latter is in the backward position, as shown by full lines in these figures. Below the chamber 252 is arranged an endless conveyor belt 254 mounted on a pulley 256 at the forward end of the machine (see Figures 1, 2 and 10), from which it passes under an idling pulley 257 to a pulley 258 at the rear end of the machine, thence upwards in an elevator casing 259 to a driving pulley 260 and downwards to a pulley 261 and in a horizontal course back to the pulley 256. The upper portion of the horizontal course of the belt is supported by the plate 262 in the conveyor, and the lower portion by a plate 264 forming the bottom of the conveyor box and preferably fastened to the channel 73 and tunnel plate 118. Within the elevator casing 259 is also mounted an endless elevating belt 266 on the pulley 258 and an upper pulley 267 in the casing. The conveyor belt 254 runs under the elevating belt 266 on the pulley 258 as shown clearly in Figure 10 and the upper pulley 267 is so placed that the two belts are tensioned against each other. The driving pulley 260 is secured to an elevator shaft 268 that is mounted in bearings 269 on the elevating casing and is preferably extended to also drive the conveyor and elevating belts in the right hand unit of the machine as shown in Figure 2. The shaft 268 is driven in the direction shown by the arrow in Figure 1 from the main driving shaft 50 by means of a pulley belt 270 running from a pulley 272 on the shaft 50 to a pulley 274 on the elevator shaft 268.

A suitable receptacle 276 into which the picked cotton is delivered from the elevator 259, is detachably arranged at the rear end of the machine.

Operation.

The operation of the machine will be readily understood from the foregoing, but the following short résumé will more fully set forth the actions and principles of the machine.

Referring to Figures 2, 14 and 15, it will be understood that as the machine advances, with the rear wheels 8 and forward wheels 10 guided on each side of a row of cotton stalks, the flared forward end of the tunnel plates 118 and 112 will guide the branches of the cotton plants into the narrow tunnel opening 110, the side branches being naturally bent forward and any portion of the plant higher than the roof of the tunnel being bent downward. At the same time the forwardly inclined shoes 216 of the machine will pass underneath any cross branches that may be situated below the lower level of the picking spindles, and, as the machine progresses, these branches are raised to a higher level, and are also bent forward when they come in contact with the outwardly flaring portion of the tunnel walls 118 and are contracted to the narrower tunnel space 110. The carrier chain traveling backwards in the tunnel relative to the machine structure at a speed making them relatively stationary with the cotton stalks, will project the lugs 245 between the stalks from both sides and underneath any branches extending in a lengthwise direction of the cotton row as the lugs pass out of the shoes 216 at the lowest point at the forward end of the shoes. As the lugs pass upwards from this point to the guide rollers 229 these branches will be gradually raised, and, as the lugs approach the rollers 229, they also raise the cross branches bent forward by the flared walls 117 up and down, above the top of the roller. All the lower branches are thus raised above the roller 229 and preferably to about the level of the lower tier of picking spindles, as shown, or to any height that may be preferable. After the moving tunnel enclosure, therefore, has contracted and confined the cotton plants in its narrow portion, it will be seen that all the branches or portions of the plants that can contain cotton bolls have been brought into the active field of the close formation of picking spindles operating from both sides of the tunnel 110 and that this has been accomplished gradually and with little disturbance or agitation of the plants. The chain lugs 245 remaining stationary with the tunnel 110 relative to the plants during the passage of the picking spindles, sustains the raised branches in the elevated position during the whole cotton picking operation. As the picking spindles are projected through the tunnel alternately from both sides by the actuating cranks 98 they move backward while in the tunnel at approximately the same speed that the machine moves forward and the disposition of the spindles in their respective opposite fields, the throw of the cranks and the ratio of crank revolutions to the forward travel of the machine is preferably proportioned so that the spindles describe intersecting circular paths or projection curves staggered and alternately proceeding from opposite sides of the tunnel as shown in Figure 15. The length of formation of the picking spindles relative to the speed ratio of crank revolutions and forward travel of the machine is preferably proportioned so that several projections and retractions or projection curves of the spindles take place at approximately the same points in the tunnel. After the cotton in the bolls has been wound on the spindles it is carried, by the retracting spindles, through the openings 124 in the tunnel walls 120, whereby trash and other foreign matter is separated from the cotton and falls to the ground. As the spindles are further retracted, the stripper heads 156, moving at less speed than the spindles engages the cotton and pushes it off the spindles in the manner hereinbefore described. It should be noted that the stripper heads, moving horizontally in unison with but a shorter distance than the picking spindles, not only support the spindles when in their projected position, but, by the advanced position they assume at the beginning of the stripping operation the time available for the stripping of the cotton is prolonged, and the stripping operation made gradual as the stripping heads are gradually retracted. This function of the vibrating stripper heads, greatly contributes to the clean and efficient stripping of the cotton from the spindles.

By the novel construction of the spindle actuating mechanism only one-third of the time required for the complete cycle of the horizontal projection and return of the stripping head and spindle, is used in the picking and stripping of the cotton and the return to near its outer position of the stripping head. This leaves two-thirds of the time of the cycle for this stripped cotton to drop by gravity on to the belt 254 in the bottom of the stripping chamber 252.

The cotton removed from the spindles drops upon the conveyor belts, and, after being carried to the rear of the machine, it enters between the conveyor belt 254 and elevator belt 266, and is elevated by these belts and discharged from between them into the receptacle 276, as indicated by the arrow in Figure 1. Obviously, from the foregoing description and the construction shown in the drawings the detailed arrangement and construction of various elements and parts of the invention, may be modified to a considerable degree without departing from the principle and scope of the invention, and we do not, therefore, in the carrying out in practice, and in the claims, limit ourselves strictly to the construction as shown and described.

We claim as our invention:

1. In a cotton picking machine, the combination, with a longitudinally movable frame member, of a transversely movable carrier mounted therein, a series of picking spindles mounted in said carrier, an independent transversely movable carrier provided with a series of stripper heads engaged by said spindles, and means for moving said frame member and said carriers, substantially as described.

2. In a cotton picking machine, the combination, with a longtudinally movable frame member, of a transversely movable carrier mounted therein, a series of picking spindles mounted in said carrier, and an independent, transversely movable carrier, also mounted in said frame member and provided with a series of stripper heads engaged by said spindles, and means for moving said frame member and said carriers, substantially as described.

3. In a cotton picking machine, the combination, with a longitudinally movable frame member, of a transversely movable carrier mounted therein, picking spindles carried by said carrier, an independent transversely movable carrier provided with stripper heads slidably engaged by said spindles, means for reciprocating the longitudinally movable member, means for transversely reciprocating said carriers, the movement of the stripper head carrier being less than the movement of the spindle carrier, substantially as described.

4. In a cotton picking machine, the combination, with a longitudinally movable frame member, of independent transversely movable carriers mounted therein, picking spindles provided on one of said carriers, and stripper heads provided on the other carrier, said stripper heads being provided with openings engaged by said spindles and in which the spindles are adapted to slide, means for reciprocating the longitudinally movable member, and means for transversely reciprocating said carriers, the movement of the stripper head carrier being less than the movement of the spindle carrier, substantially as described.

5. In a cotton picking machine, the combination, with a longitudinal, movable frame member, and an upright plate connected therewith and provided with a series of openings, and forming one wall of a cotton plant confining space, of independent transversely movable carriers mounted in the longitudinally movable member, picking spindles mounted on one of said carriers, stripper heads slidably engaged by said spindle, and mounted on said other carrier, said spindles being arranged in line with the openings in said vertical plate, and means for reciprocating said frame member and said carriers, substantially as described.

6. In a cotton picking machine, the combination, with a picking spindle carrier and a series of spindles mounted therein, of a stripper head carrier provided with stripper heads slidably engaged by said spindles, and means for reciprocating said carriers, the stripper head carrier being given a shorter movement than the spindle carrier, for the purpose set forth.

7. In a cotton picking machine, the combination, with an upright plate forming one wall of a cotton plant confining space, of a picking spindle carrier arranged parallel with said plate, a stripper head carrier arranged parallel with said plate, and between said plate and the spindle carrier, and means for reciprocating said carriers towards and from said plate, for the purpose set forth.

8. In a cotton picking machine, the combination, with a picking spindle carrier and a series of picking spindles mounted thereon, of a stripper head carrier provided with stripper heads slidably engaged by said spindles and means for reciprocating both of said carriers in the line of the axis of said spindles, for the purpose set forth.

9. In a cotton picking machine, the combination, with a picking spindle carrier and a series of picking spindles mounted thereon, of a stripper head carrier provided with stripper heads slidably engaged by said spindles, means for reciprocating both of said carriers in the line of the axis of the said spindles and means for rotating said stripper heads and spindles.

10. In a cotton picking machine, the combination, with a reciprocating picking spindle, of a stripper head through which said spindle extends, and means for reciprocating said spindle and stripper head lengthwise of the axis of said spindle, for the purpose set forth.

11. In a cotton picking machine, the combination, with a reciprocating picking spindle, of a stripper head through which said spindle extends, means for reciprocating said spindle and stripper head lengthwise of the axis of said spindle, the movement of the stripper head being less than the movement of the spindle, for the purpose set forth.

12. In a cotton picking machine, the combination, with a reciprocating picking spindle, of a stripper head through which said spindle extends, the spindle and stripper head being connected for simultaneous rotation but independently movable in the direction of the length of the spindle, means for rotating said stripper head, and thereby rotating said spindle, and means for imparting a longitudinal reciprocation to both the spindle and the stripper head, the longitudinal movement of the stripper head being less than the longitudinal movement of the spindle, for the purpose set forth.

13. In a cotton picking machine, the combination, with a reciprocating and rotatable picking spindle, of a stripper head through which said spindle extends, means for simultaneously rotating said stripper head and spindle and means for imparting a longitudinal reciprocation to both the spindle and the stripper head, the longitudinal movement of the stripper head being less than the longitudinal movement of the spindle, for the purpose set forth.

14. In a cotton picking machine, the combination, with an upright, longitudinally extending plate forming one wall of a cotton plant confining space, said plate being provided with a series of openings, of a picking spindle carrier extending parallel with said plate, and mounted to reciprocate towards and from the plate, a series of spindles on said carrier in line with the openings in said plate, a stripper head for each spindle located between the spindle carrier and said plate and means for moving said spindle carrier towards and from said plate and thereby projecting said spindles through the openings in the plate into the cotton plant confining space, and means for reciprocating said stripper heads with said spindles for the purpose set forth.

15. In a cotton picking machine, the combination, with longitudinal enclosure walls forming a tunnel in which the cotton plants are confined, of cotton picking spindles adapted to be projected laterally across said tunnel, vertically arranged crank shafts adapted to actuate said spindles in horizontal circular paths, and driving and supporting means co-operating with said crank shafts for moving said spindles laterally across said tunnel in an alternating forward and backward curved course relative to the forward travel of the machine.

16. In a machine of the class described, the combination, with a cotton plant enclosing tunnel having structurally fixed and longitudinally reciprocating separated tunnel walls, of reciprocating frames to which said reciprocating tunnel walls are connected, spindle carriers adapted to reciprocate transversely in said reciprocating frames, rotating picking spindles arranged in said spindle carriers, vertically mounted crank shafts driven in unison and adapted to actuate said spindle carriers in a horizontal circular path, and means co-operating with said crank shafts, and said reciprocating frames and spindle carriers, for moving said picking spindles laterally across said tunnel through said perforated tunnel walls.

17. In a cotton picking machine, the combination, with a main frame, of a picking tunnel in which the cotton plants are confined, said tunnel comprising vertical side walls and a roof wall, means for supporting said tunnel walls in a structurally fixed position, a reciprocating frame supporting cotton picking spindles, side wall sections of the tunnel connected to said reciprocating frame and moving therewith, the said sections having apertures through which the picking spindles are projected into said tunnel and overlapping connections between the fixed and the moving side walls of the tunnel.

18. In a cotton picking machine, the combination with a carriage frame, and means for supporting and moving the same, of longitudinally arranged plant enclosure walls, formed in sections, and extending from front to rear of said carriage, means securing the forward and rear sections of said walls rigidly to the carriage frame, and means independently supporting the intermediate sections of said walls and permitting a reciprocating motion to be imparted to said intermediate sections.

19. In a cotton picking machine, the combination, with a carriage frame and means for supporting and moving the same, of longitudinally arranged enclosure walls secured to said frame and forming a plant confining space extending from the front to the rear of said carriage, means securing the forward and rear sections of said walls rigidly to the carriage frame, means for movably securing the intermediate sections, and means for reciprocating said intermediate sections, for the purpose set forth.

20. In a cotton picking machine, the combination, with a carriage frame and means for supporting and moving the same, of longitudinally arranged sectional enclosure walls extending from the front to the rear of said frame and forming a plant confining space, with the forward and rear sections of said walls rigidly secured to the carriage frame and with the intermediate sections movably supported upon said frame, said intermediate sections being provided with openings, picking spindles arranged to move longitudinally of said carriage with said movable wall sections, and means for transversely reciprocating said spindles and causing them to be alternately projected through the openings in said movable wall sections into the plant confining space, and to be withdrawn therefrom.

21. In a cotton picking machine, the combination, with a carriage frame and means for supporting and moving the same, of longitudinally arranged plant enclosing walls extending from front to rear of said carriage, means movably supporting sections of said walls, and cotton picking spindles arranged to move with said walls and to be alternately projected into said plant confining space and withdrawn therefrom through openings in the movable wall sections.

22. In a cotton picking machine, the combination, with a carriage frame and means for supporting and moving the same, of longitudinally arranged plant enclosing walls supported upon said carriage and extending from front to rear thereof, means movably supporting sections of said walls, picking spindles arranged to move with said movable sections and to be alternately projected into said plant enclosing space and withdrawn therefrom through openings in said movable sections, and stripper heads arranged to strip the cotton from said spindles during the withdrawal movement.

23. In a cotton picking machine, the combination, with a carriage frame and means for supporting and moving the same, of a longitudinally arranged plant enclosing space or tunnel extending from front to rear of said machine, and provided with reciprocating walls having openings therein, of cotton picking spindles arranged in the rear of said walls, means imparting to said spindles reciprocatory movements with said walls, and stripper heads arranged in the rear of said walls, and engaged by said spindles and means for reciprocating said spindles through said stripper heads and through the openings in said walls.

24. In a cotton picking machine, the combination, with a carriage frame and means for supporting and moving the same, of longitudinally arranged walls forming a plant confining space, forwardly extending and downwardly inclined shoes arranged at each side of the forward end of said plant confining space, endless chains supported near the lower edges of the walls of said shoes and the walls enclosing the plant confining space, said chains being provided with inwardly extending plant-raising lugs, and means for driving said chains from the front towards the rear of the machine, as the machine is advanced.

25. In a cotton picking machine, the combination, with a carriage frame, and means supporting and moving the same, of longitudinally arranged walls supported by said frame and forming a plant confining space, guides provided near the lower edges of said walls, endless chains provided with lugs projecting through said guides into said plant confining space, and means for moving said chains and causing said lugs to travel in said space from the front towards the rear of said machine, for the purpose set forth.

26. In a cotton picking machine, the combination, with rotatable picking spindles arranged in staggered relation, and in vertical rows and a sprocket wheel connected with each spindle, of driving chains extending between the rows of spindles and alternately engaging the sprocket wheels of the adjoining vertical rows of spindles, whereby the opposite rows of spindles are driven in different directions.

27. The combination, with a cotton picking spindle having a series of sharp edges, each of such edges being provided with a series of teeth, of a stripper head through which said spindles pass and by which it is rotated, and means for simultaneously reciprocating said spindle and stripper head.

In witness whereof, we have hereunto set our hands this 5th day of February, 1923.

FRANK PHELPS.
MORTON F. PHELPS.